W. G. BOONZAIER.
VALVELESS PUMP.
APPLICATION FILED NOV. 22, 1920.
1,438,691.
Patented Dec. 12, 1922.
4 SHEETS—SHEET 1.
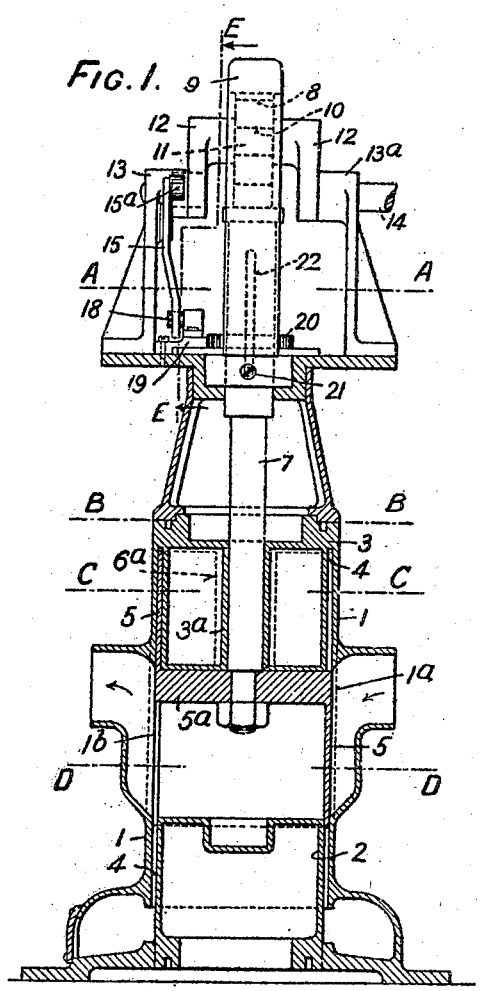
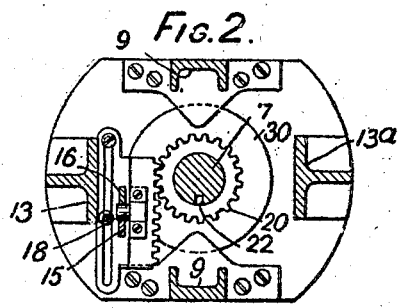
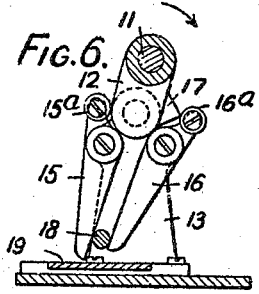
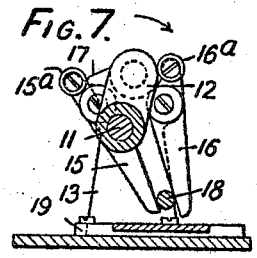
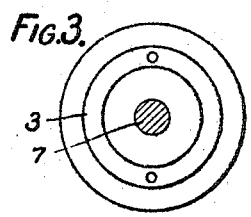
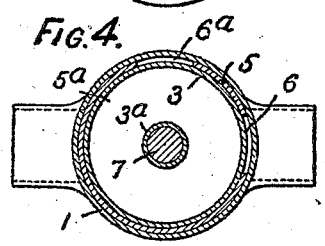
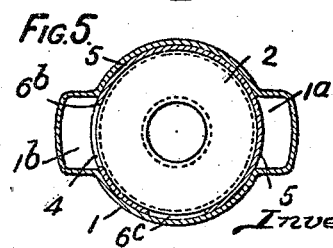

W. G. BOONZAIER.
VALVELESS PUMP.
APPLICATION FILED NOV. 22, 1920.
1,438,691.
Patented Dec. 12, 1922.
4 SHEETS—SHEET 2.
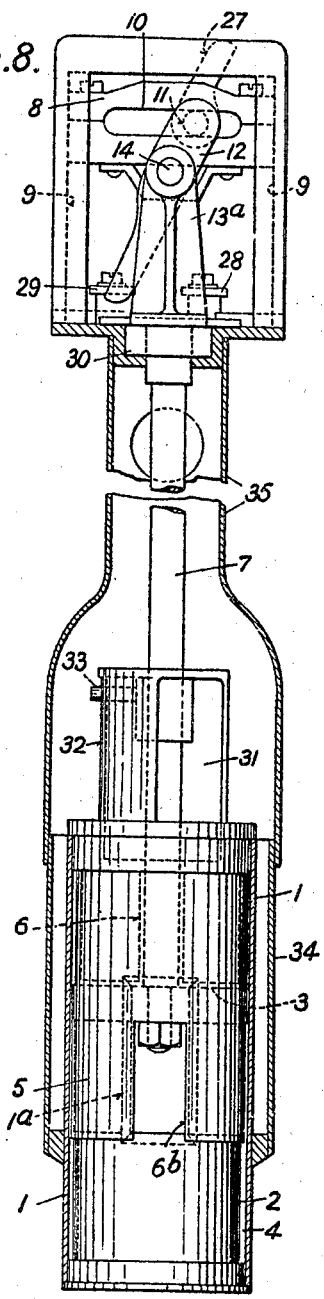
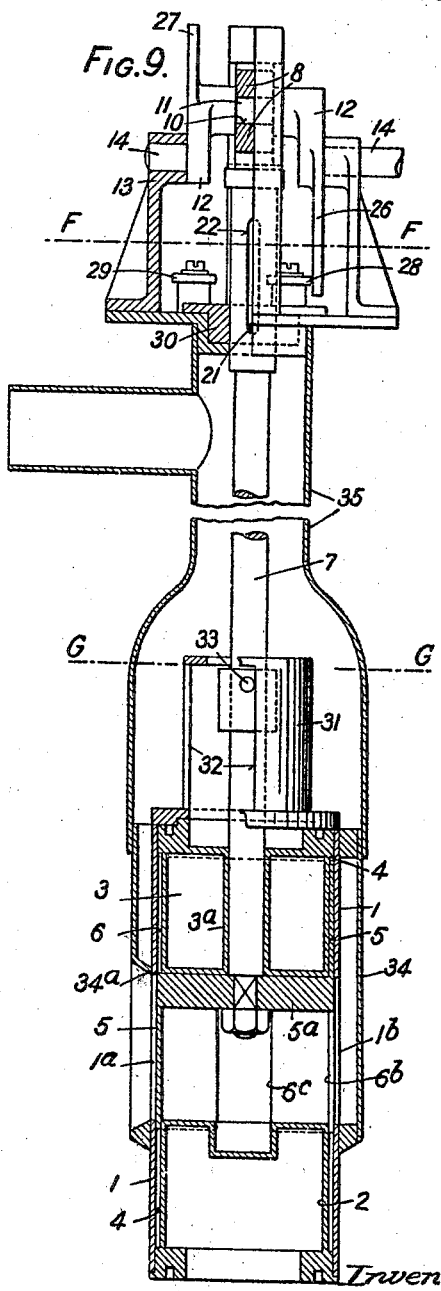
Inventor:
Wilhelm Govt Boonzaier
By Davis & Davis
Attys W. G. BOONZAIER.
VALVELESS PUMP.
APPLICATION FILED NOV. 22, 1920.
1,438,691.
Patented Dec. 12, 1922.
4 SHEETS—SHEET 3.
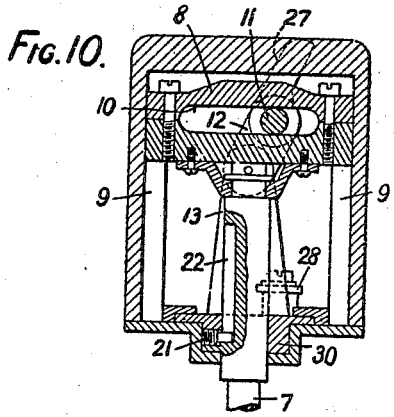
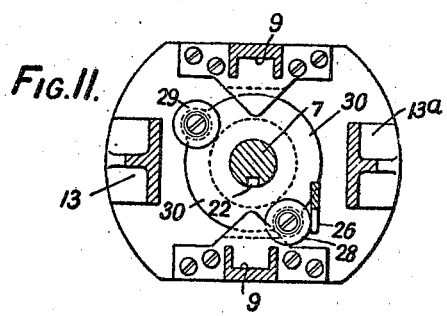
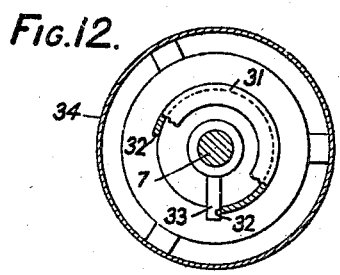
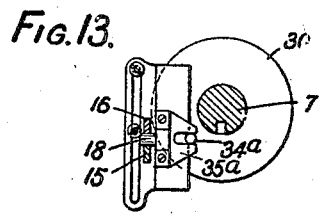
Inventor:
Wilhelm Gort Boonzaier
By Davis & Davis
Attys W. G. BOONZAIER.
VALVELESS PUMP.
APPLICATION FILED NOV. 22, 1920.
1,438,691.
Patented Dec. 12, 1922.
4 SHEETS—SHEET 4.
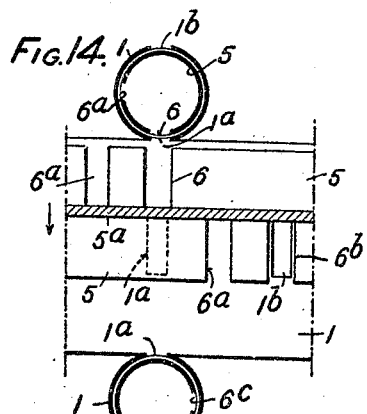
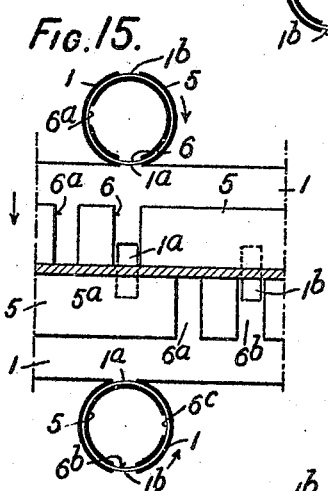
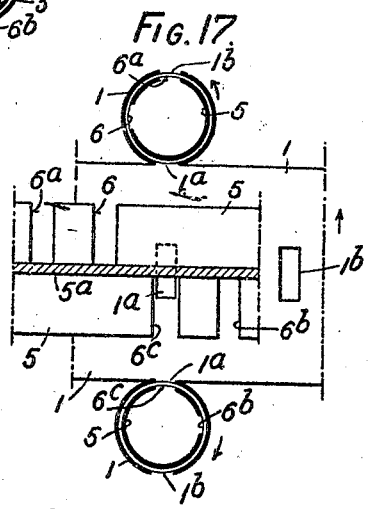
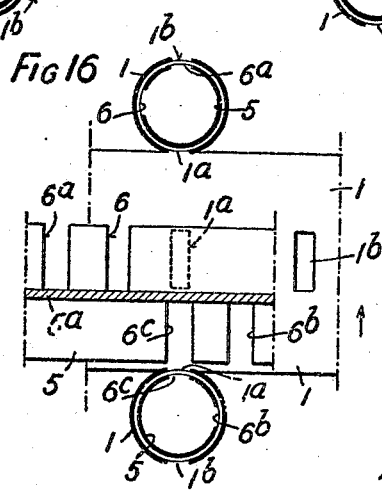
Inventor:
Wilhelm Govt Boonzaier
By Davis & Davis
Attys Patented Dec. 12, 1922.

1,438,691

UNITED STATES PATENT OFFICE.

WILHELM GOERT BOONZAIER, OF LONDON, ENGLAND.

VALVELESS PUMP.

Application filed November 22, 1920. Serial No. 425,689.

*To all whom it may concern:*

Be it known that I, WILHELM GOERT BOONZAIER, a subject of the King of Great Britain, residing at 11 Bramfield Road, New Wandsworth, London, S. W. 11, England, have invented certain new and useful Improvements in Valveless Pumps, of which the following is a specification.

This invention relates to improvements in pumps more particularly surface, bore hole, or deep well pumps for fluid, air, gas or other requirements, and has for its object, by effecting the operation of opening and closing the inlet and outlet ports by means of alternate axially reciprocating and rotary oscillating movements of the piston or cylinder itself, to dispense with independently operated valves as hitherto used.

This is attained by movably arranging a cylinder in a cylindrical casing provided preferably diametrically opposite each other with inlet and outlet ports in such a way that it performs on the one hand the functions of a piston and on the other hand controls the said ports. This cylinder, which is closed at one end thus forming one chamber for single stroke pumps, or is divided by a partition in two sides or chambers for two stroke pumps, is provided in the chamber walls with two ports arranged at an angle preferably of 90° and is adapted to receive alternate axially reciprocating and rotary oscillating movements in such a way that, in the case of a single stroke pump, in its axial travel in one direction the chamber of the cylinder is in communication with the inlet port of the casing and by an oscillatory movement of the cylinder at the end of the said stroke the said inlet port is closed and the outlet port opened so that on the reverse stroke the fluid is delivered through the outlet port. In the case of a two stroke pump the ports of the two sides of the cylinder are arranged diametrically opposite each other so that while the one or forward side as regards direction of travel acts as delivery side, the other or rear side acts as the suction side.

The working chamber is limited by means of a stationary head or heads inserted from and secured to the end or ends of the cylindrical casing in such a way that its length approximately corresponds to the length of the stroke whereby the efficacy of the working of the cylinder which alternately functions as suction and delivery chamber is increased. The head or heads are arranged in such a manner that an annular space is formed between the piston and the surrounding casing, which space serves as a guide for the cylinder in its reciprocations.

Axially reciprocating as well as rotary oscillating movements are imparted by means of a cranked driving shaft operating the pump rod, which is rigidly secured to the cylinder in such a way that at the end of each stroke the rod receives a rotary oscillatory movement through 90°. This may be effected for example by means of a cam mounted on the crank shaft imparting directly or through levers alternately reciprocating motion to a rack which is in mesh with a pinion mounted on the pump rod, or it may be effected by arms attached to the crank webs alternately engaging a collar on the pump rod, or by any other suitable means.

For bore hole or deep well pumps the pump casing is surrounded by a jacket which is in direct communication with the outlet port of the casing, while a channel through the jacket connects the inlet port to the supply. To this jacket is connected the pump piping through which the fluid is delivered, and which may be extended in the usual manner as the boring proceeds.

In order to enable the operator when the delivery piping is lengthened to join up the driving gear in correct position in relation to the cylinder, an indicator mounted on the top of the pump casing may be provided. This indicator consists in an arm or pin fixed to the pump rod, which limits the oscillatory movements of the pump rod by striking against abutments provided for the purpose.

The invention will now be described as applied to a double acting pump, one example being a surface pump and another a pump for use in a bore hole.

The accompanying drawings show examples of constructional forms of a pump embodying the invention:

Fig. 1 is a sectional elevation of a two-stroke surface pump.

Fig. 2 is a horizontal section on the line A—A.

Fig. 3 is a similar section on the line B—B.

Fig. 4 is a similar section on the line C—C and

Fig. 5 is a similar section along line D—D of Fig. 1,

Figs. 6 and 7 are vertical sections on the line E—E of Fig. 1 showing some operative parts in their two extreme positions, Fig. 8 shows in part sectional elevation, a construction of pump adapted for use in deep well or bore holes, and comprises a modified type of actuating gear, while Fig. 9 shows the same mainly in vertical section viewed at right angles to Fig. 8.

Fig. 10 is a vertical section of the driving gear shown in Figs. 8 and 9.

Fig. 11 is a horizontal section on the line F—F and

Fig. 12 is a similar section on the line G—G of Fig. 9.

Fig. 13 shows in sectional plan a modification of certain operating members of the driving gear shown in Figs. 1, 2, 6 and 7.

Figs. 14, 15, 16 and 17 illustrate diagrammatically the various relative positions of the ports in the course of a complete cycle of operation.

A cylindrical casing 1 has rigidly mounted in its ends what I term stationary heads 2 and 3, in such a way that they project into the interior of the said casing to an extent leaving between their heads a clear space constituting the working chamber of the pump and corresponding approximately to the length of the stroke of the pump, when between their outer surface and the casing annular spaces 4 (slightly longer than the stroke) are formed, such annular spaces being adapted to receive and guide the skirt or cylinder 5. The upper head 3 is centrally provided with a sleeve $3^a$ through which the piston rod 7 passes when secured to the piston $5^a$. This piston $5^a$ divides the cylinder into two equal halves, hereinafter to be called the lower and upper cylinder respectively, which are adapted to alternately telescope over the corresponding heads 2 and 3 and are each provided with two notches or openings constituting part of inlet and outlet ports 6 and $6^a$ and $6^b$ and $6^c$, arranged at an angle of 90° to each other, the parts 6 and $6^a$ of the upper cylinder being diametrically opposite to the ports $6^b$ and $6^c$ of the lower cylinder. The casing 1 is provided with an inlet port $1^a$ and an outlet port $1^b$ arranged diametrically opposite each other and communicating with the working chamber between the pistons 2 and 3.

A combined reciprocating and oscillating motion is given to the cylinder through the medium of the pump rod 7 which is rigidly secured to the partition $5^a$ of cylinder 5 by any suitable means which will ensure the cylinder partaking of, by the reciprocating as well as rotary oscillating motions of the rod 7. The upper end of the pump rod 7 is rotatably connected to a cross head 8, see Figures 8 to 10, working in guides 9 and provided with a slot 10 which engages the crank pin 11 of the cranked driving shaft 14 so that rotation of the said shaft 14 effects the reciprocating motion of rod 7 and cylinder 5. The crank shaft 14 is journalled in brackets 13 and $13^a$.

One of the crank webs 12 carries a nose or cam 17 which in revolving engages alternately rollers $15^a$ and $16^a$ mounted on the upper arms of rocking levers 15 and 16 pivoted on the bracket 13, and causes thereby the lower arms of the respective levers to operate alternately and in opposite directions a slidably arranged rack 19 by means of a pin 18 attached thereto (Figs. 6 and 7).

In mesh with the rack 19 is a pinion 20 rigidly connected to a collar 30 which collar, while being prevented from axial displacement in its bearing transmits the oscillatory motion it receives from the rack and pinion, by means of a pin 21 and keyway 22 to the pump rod 7 which is, however, free to move axially in the collar.

The pump is operated as follows:—

Rotation of the crank shaft 14 imparts to the cross-head and consequently to the connecting rod 7 and cylinder 5 attached thereto a reciprocating motion, while the cam 17 is so arranged that it operates the levers 15 and 16 when the crank is near its dead centre positions and imparts therefore the oscillating motion of 90° to the cylinder when the latter has practically completed its up and its down stroke.

The diagrams Figs. 14 and 17 show the relative positions of cylinder and casing in development and in progressive stages during the course of a complete cycle of operation.

Starting from the up position (Fig. 14) the lower cylinder having its port $6^b$ in communication with the delivery port $1^b$ of the casing, operates on its down stroke as delivery side, gradually closing the delivery port $1^b$ (Fig. 15) while the upper cylinder, which by means of its port 6 gradually opens the inlet port $1^a$ of the casing becomes the suction side. Arriving near the end of the stroke the cylinder is caused to rotate 90° to the left (Fig. 16) so that the delivery port $1^b$ is uncovered by the port $6^a$ of the upper cylinder, which now becomes the delivery side, and gradually closes the delivery port $1^b$ while port $6^c$ of the lower cylinder, which now is the suction side gradually opens the inlet port $1^a$ of the casing (Fig. 17) until, when nearing the end of the stroke, the cylinder is caused to rotate to the right, back into its starting position (Fig. 14).

A sludge or sand collecting chamber 23 in communication with the annular space 4 between the piston 2 and casing 1 is preferably provided at the base of the latter.

When the pump is intended for bore holes or the like (Figs. 8 and 9) it is surrounded by a jacket 34 extending from below and in direct communication with the delivery port 1ᵇ, a channel 34ᵃ through the said jacket providing communication to the inlet port 1ᵃ of the casing 1. To this jacket 34 is connected the pump piping 35 through which the fluid is delivered to the surface, and which may in the usual manner be extended as required.

A modified form of driving gear for use particularly in connection with a bore hole pump is shown in Figs. 8 to 12.

The oscillating motion of the cylinder, in this case is effected by levers 26, 27 preferably formed as integral parts of and in alignment with the crank webs 12 and extend outwards in opposite directions. On the collar 30, embracing the connecting rod 7 in the manner described with regard to the previously described construction, are mounted on two projections the rollers 28, 29 in such positions that one or the other lies in the path of one of the levers 26, 27 respectively so that when the latter swing round with the crank shaft 14 they alternately turn the collar 30 and thereby the connecting rod in one direction or the other through an angle of 90°.

In order to enable the operator, when the piping is lengthened to join up the driving gear into the correct position in relation to the cylinder an indicator is mounted on the top of the pump casing. This indicator consists preferably of a cylindrical cap 31 (Figs. 8, 9 and 12) over the top of the pump having one or two longitudinal slots which extend in width approximately over an angle of 90°, and in length are somewhat in excess of the stroke of the pump. The vertical edges 32 of such slot or slots form limiting abutments for a pin or arm 33 fixed on the pump rod 7 to limit thereby the oscillatory motion of the said rod, and thus indicate to the operator the two extreme positions, both axially as well as rotary, of the cylinder.

Instead of a cylindrical cap 31 two vertical rods, connected at the top for stiffening purposes might be mounted on the top of the pump.

Figure 13 shows a slight modification of the driving gear shown particularly in Fig. 2. The rack and pinion are here replaced by a fork or slotted plate 35ᵃ and a pin 34ᵃ, which latter is mounted on the collar 30. The slot is sufficiently deep to allow of the rotary motion of the collar and pin. The longitudinal reciprocation of the slotted plate can be effected in the same way as the rack bar or in other convenient manner.

In a single stroke pump only one head is required and the cylinder is one sided or is in the form of a cylindrical cup, the rotary oscillating movement being imparted to the cylinder as in the two stroke pump.

What I claim and desire to protect by Letters Patent is:—

1. A reciprocatory pump in which the operation of opening and closing the inlet and outlet ports in the pump casing is performed by alternate axially reciprocating and rotary oscillating movements of a transversely partitioned open ended cylinder in said casing, means being provided for automatically imparting said rotary movements to the cylinder in a quick manner at the ends of the axial reciprocations.

2. A single stroke reciprocatory pump comprising an open ended cylinder closed at one end and provided with two lateral ports and a cylindrical casing provided with co-operating inlet and outlet ports, the cylinder being adapted to operate as a piston within the outer casing and to receive alternate axially reciprocating and rotary oscillating movements in such a way that on completion of the stroke the inlet port and on completion of the reverse stroke the outlet port of the casing is opened, means being provided for automatically imparting said rotary movements to the cylinder in a quick manner at the ends of the axial reciprocations.

3. A two stroke pump comprising a cylinder open at its ends and divided by a transverse piston-like partition into two open ended chambers, each chamber being provided with an inlet and a delivery port in its wall arranged at a suitable angle to each other, the inlet port of one chamber being diametrically opposite the delivery port of the other chamber, and vice versa, and a cylindrical casing, having an inlet port and an outlet port arranged diametrically opposite each other, the cylinder being adapted to be operated by a rod as a piston within the casing and means being provided to impart to said rod alternate axially reciprocating and rotary oscillating movements, the rotary oscillating movements taking place at the ends of the axial reciprocating movements so that, in its axial travel—and having regard to the direction of the stroke—the forward chamber of the cylinder, when one of its ports is in communication with the outlet port of the casing, operates as the delivery side of the pump, while the rear chamber of the cylinder, by gradually opening the inlet port operates as the suction side, while at the end of each stroke the functions of the two sides of the cylinder are reversed, by the oscillatory movement of the cylinder, substantially as described.

4. In a pump as set forth in claiming clause 3 the arrangement in the pump casing of two stationary heads one at either end thereof to form a working chamber between the said two heads, which chamber alternately fulfills the functions of a suction and a delivery chamber substantially as described.

5. In a pump as set forth in claim 1, the means for producing the alternate axially reciprocating and rotary oscillatory movements of the cylinder comprising a reciprocating pump rod attached to a piston-like partition in the cylinder and passing through a collar secured against axial displacement and embracing the said rod in such a way that the latter while sliding in the collar is constrained to follow the rotary oscillating movements which it receives intermittently from the means for reciprocating the rod, substantially as described.

6. A pump as set forth in claim 1, in which the rotary and oscillatory movement of the cylinder reciprocating rod is effected by a pin and slot connection between the rod operating the cylinder and the motion transmitting device substantially as described.

7. In a pump as set forth in claim 1, means for effecting and controlling the rotary oscillatory movements of the cylinder reciprocating rod comprising a toothed pinion secured to a collar surrounding the rod and a reciprocating rack bar engaging therewith, said rack bar being moved to and fro by levers operated by a cam on a crank which effects the raising and lowering of the rod.

8. A pump as set forth in claim 1, particularly adapted for use in bore holes, deep wells or the like in which the delivery is made into a jacket which surrounds the pump casing and is connected to the delivery piping, and in which the inlet port is formed by an opening in the jacket and casing, whereby suction is obtained from without into the pump casing substantially as described.

9. In a pump as set forth in claiming clause 4 the provision of an indicator for the purpose of indicating the exact position of the cylinder in relation to its casing and consisting in an abutment fixed on the upper or forward piston in combination with an adjustable projection or arm on the cylinder operating rod substantially as described.

10. A pump as set forth in claim 1 having a stationary piston within the pump casing providing an annular space between the exterior wall of the piston and the interior wall of the casing in which space the wall of the open ended cylinder works in its reciprocating movements whereby the water in this space is also discharged in the operation of the pump in addition to that in the cylinder proper substantially as described.

In testimony whereof I affix my signature in presence of two witnesses.

WILHELM GOERT BOONZAIER

Witnesses:
ARTHUR JAMES CADMAN,
HAROLD DOUGLAS ELKINGTON.